(12) United States Patent
Motoki et al.

(10) Patent No.: US 8,709,612 B2
(45) Date of Patent: Apr. 29, 2014

(54) ELECTRONIC COMPONENT

(75) Inventors: Akihiro Motoki, Nagaokakyo (JP);
Makoto Ogawa, Nagaokakyo (JP);
Atsuko Saito, Nagaokakyo (JP);
Toshinobu Fujiwara, Nagaokakyo (JP);
Kenji Masuko, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 188 days.

(21) Appl. No.: 13/444,925

(22) Filed: Apr. 12, 2012

(65) Prior Publication Data
US 2012/0288731 A1 Nov. 15, 2012

(30) Foreign Application Priority Data
May 11, 2011 (JP) .................... 2011-105932

(51) Int. Cl.
| | | |
|---|---|---|
| B32B 15/00 | (2006.01) | |
| C22F 1/00 | (2006.01) | |
| C22F 1/16 | (2006.01) | |
| B05D 3/06 | (2006.01) | |
| C25D 5/50 | (2006.01) | |
| C25D 3/30 | (2006.01) | |
| C25D 3/60 | (2006.01) | |
| H01G 4/12 | (2006.01) | |
| H01G 4/252 | (2006.01) | |
| H01G 9/04 | (2006.01) | |
| C22C 13/00 | (2006.01) | |

(52) U.S. Cl.
CPC *C25D 5/505* (2013.01); *C25D 3/30* (2013.01); *C25D 3/60* (2013.01); *H01G 4/12* (2013.01); *H01G 4/252* (2013.01); *H01G 2009/0404* (2013.01); *C22F 1/00* (2013.01); *C22F 1/16* (2013.01); *B05D 3/065* (2013.01); *C22C 13/00* (2013.01); *C22C 2200/00* (2013.01); *B32B 15/00* (2013.01); *Y10S 428/929* (2013.01); *Y10S 428/935* (2013.01)
USPC ........... 428/647; 428/648; 428/929; 428/935; 205/225; 148/518; 148/537

(58) Field of Classification Search
None
See application file for complete search history.

(56) References Cited

U.S. PATENT DOCUMENTS

| | | | | |
|---|---|---|---|---|
| 6,373,683 | B1 * | 4/2002 | Higuchi et al. ............... | 361/305 |
| 6,769,160 | B2 * | 8/2004 | Higuchi et al. ............. | 29/25.42 |
| 6,773,827 | B2 * | 8/2004 | Higuchi ....................... | 428/646 |
| 8,013,428 | B2 * | 9/2011 | Hooghan et al. ............. | 257/666 |
| 2002/0046787 | A1 * | 4/2002 | Kanematsu et al. .......... | 148/518 |
| 2010/0089982 | A1 | 4/2010 | Sakuyama | |
| 2010/0311288 | A1 * | 12/2010 | Horn et al. ................... | 439/886 |
| 2012/0288724 | A1 * | 11/2012 | Ogawa et al. ................ | 428/457 |

FOREIGN PATENT DOCUMENTS

WO 2006/134665 A1 12/2006

* cited by examiner

*Primary Examiner* — John J Zimmerman
(74) *Attorney, Agent, or Firm* — Keating & Bennett, LLP

(57) ABSTRACT

A laminated ceramic capacitor includes a rectangular solid-shaped electronic component element. External electrodes of terminal electrodes are disposed at one end surface and the other end surface of the electronic component element. First plated films including a Ni plating are disposed on the surfaces of external electrodes. On the surfaces of the first plated films, second plated films containing Sn are disposed as Sn-plated films defining outermost layers of the external electrodes. The second plated films have a polycrystalline structure, and flake-shaped Sn—Ni alloy grains are located at a Sn crystal grain boundary and within a Sn crystal grain, respectively.

4 Claims, 10 Drawing Sheets

FLAKE-SHAPED Sn-Ni ALLOY GRAINS

FLAKE-SHAPED Sn-Ni ALLOY GRAINS

ELECTRONIC COMPONENT

BACKGROUND OF THE INVENTION

1. Field of the Invention

The present invention relates to an electronic component, and more particularly to an electronic component including a Sn-plated film, such as a laminated ceramic capacitor, for example.

2. Description of the Related Art

As a background technique for the present invention, for example, International Publication WO2006/134665 discloses a member on which a film having Sn as a main ingredient is formed, a film formation method and a soldering method.

If a film is formed on a terminal for a connector, a lead frame for a semiconductor integrated circuit or the like, by plating a metal that has Sn as a main ingredient and does not contain Pb, in place of plating Sn—Pb solder which has been conventionally done, from the viewpoint of environmental protection in recent years, whisker-like crystals, called whiskers, of Sn tend to develop in the film. When whiskers develop and grow, they may cause an electric short-circuit failure between adjacent electrodes. When whiskers separate from a film and scatter, the scattering whiskers become a cause of inducing a short-circuit inside and outside the equipment.

In the technique disclosed in International publication WO2006/134665, for the purpose of providing a member having a film which can suppress development of such whiskers, an intermetallic compound layer of Sn and a first metal such as Ni is formed at a grain boundary of Sn particularly in a film having Sn as a main ingredient.

However, the film disclosed in International publication WO2006/134665 cannot meet the criterion of Class 2 when conducting the following thermal shock test defined in the JEDEC Standard considered as an industrial standard.

Thermal Shock Test

Number of samples (n): 3 lots×6/lot=18.

Test conditions: the sample is held at −55° C. (+0/−10) as a minimum temperature and 85° C. (+10/−0) as a maximum temperature for 10 minutes, respectively, and given 1500 cycles of thermal shock in a gas phase.

Observation: observations are made by a 1000× electron photomicrographic image using a scanning electron microscope (SEM).

Criterion: Class 2 (infrastructure equipment for communication, automobile equipment) is applied, and the maximum length (straight line length) of whiskers is 45 μm or less.

Thus, it is desirable to dramatically improve a capability of suppressing whiskers in an electronic component having a Sn-plated film including Sn, such as a laminated ceramic capacitor.

SUMMARY OF THE INVENTION

Accordingly, preferred embodiments of the present invention provide an electronic component having a dramatically improved capability of suppressing and preventing whiskers.

A preferred embodiment of the present invention provide an electronic component including a Sn-plated film, wherein the Sn-plated film has a polycrystalline structure, and Sn—Ni alloy grains are formed at a Sn crystal grain boundary and within a Sn crystal grain, respectively.

In the electronic component according to a preferred embodiment of the present invention, the Sn—Ni alloy grain is preferably flake shaped.

In the electronic component according to a preferred embodiment of the present invention, the Ni-plated film is preferably formed so as to contact the inside of the Sn-plated film. In this case, preferably 3 or more Sn—Ni alloy grains on average are present within a Sn crystal grain contacting the Ni-plated film in the Sn-plated film.

In the electronic component according to a preferred embodiment of the present invention, Sn—Ni alloy grains are formed at a Sn crystal grain boundary and within a Sn crystal grain in the Sn-plated film of the electronic component, thus dramatically improving a capability of suppressing and preventing whiskers. By providing such a unique structure, compressive stresses in the Sn-plated film are reduced, initial points at which whiskers develop are decentralized and energy for development of whiskers decreases.

Formation of Sn—Ni alloy grains at a Sn crystal grain boundary and within a Sn crystal grain in a Sn-plated film, as in the electronic component according to a preferred embodiment of the present invention, can be achieved by, for example, plating Sn onto the surface of another film containing Ni as a Sn-plated film and carrying out a heat treatment at a relatively low temperature for a long period of time, or by plating a Sn—Ni alloy with the Sn content being greater than the Ni content, i.e., a Sn-rich Sn—Ni alloy, as a Sn-plated film, and carrying out a heat treatment at a relatively low temperature. By plating a Sn—Ni alloy in place of plating Si, thermal treatment time can be reduced as Ni is already present in the plating. If the temperature for heat treatment of the Sn-plated film is too high, a stable $Ni_3Sn_4$ phase is generated, diffusion of Ni stops, only spherical crystals of a Sn—Ni alloy are generated in the Sn-plated film, and therefore the stress reducing effect cannot be expected, thus making it impossible to obtain a whisker suppressing effect.

For further improving the whisker suppressing effect in the electronic component according to a preferred embodiment of the present invention, preferably the Sn—Ni alloy grain is flake-shaped, and further it is especially preferable that a Ni-plated film be formed so as to contact the inside of the Sn-plated film and 3 or more Sn—Ni alloy grains on average are present within a Sn crystal grain contacting the Ni-plated film in the Sn-plated film.

According to a preferred embodiment of the present invention, an electronic component having a dramatically improved capability of suppressing and preventing whiskers is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
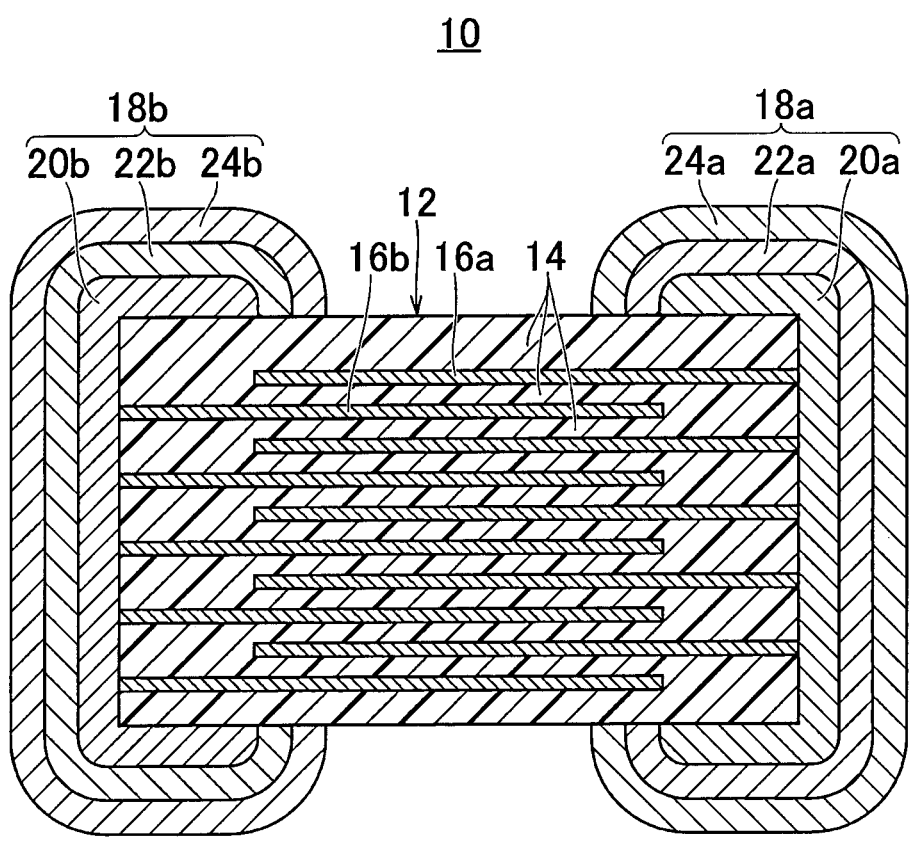
FIG. 1 is a cross-sectional schematic view showing one example of a laminated ceramic capacitor according to a preferred embodiment of the present invention.

FIG. 1 is a cross-sectional schematic view showing one example of a laminated ceramic capacitor according to a preferred embodiment of the present invention.

A laminated ceramic capacitor 10 shown in FIG. 1 includes a rectangular solid-shaped ceramic element 12. The ceramic element 12 includes multiple ceramic layers 14 including, for example, a barium titanate-based dielectric ceramic as a dielectric material. These ceramic layers 14 are stacked, and internal electrodes 16a and 16b including, for example, Ni are alternately formed among the ceramic layers 14.

In this case, the internal electrode 16a is arranged to have one end extending to one end of the ceramic element 12. The internal electrode 16b is arranged to have one end extending to the other end of the ceramic element 12.

Further, the internal electrodes 16a and 16b are arranged such that a middle portion and the other end overlap each other with the ceramic layer 14 interposed therebetween. Thus, the ceramic element 12 has a laminated structure in which a plurality of internal electrodes 16a and 16b are provided with ceramic layers 14 interposed therebetween.

At one end surface of the ceramic element 12A, a terminal electrode 18a is arranged to be connected to the internal electrode 16a. Similarly, at the other end surface of the ceramic element 12, a terminal electrode 18b is arranged to be connected to the internal electrode 16b.

The terminal electrode 18a includes an external electrode 20a including, for example, Cu. The external electrode 20a is disposed at one end surface of the ceramic element 12 so as to be connected to the internal electrode 16a. Similarly, the terminal electrode 18b includes an external electrode 20b including, for example, Cu. The external electrode 20b is disposed at the other end surface of the ceramic element 12 so as to be connected to the internal electrode 16b.

First plated films 22a and 22b containing Ni are disposed on the surfaces of the external electrodes 20a and 20b, respectively, to prevent solder leach.

Further, second plated films 24a and 24b containing Sn are disposed on the surfaces of the first plated films 22a and 22b, respectively, to improve solderability and to define Sn-plated films defining outermost layers. The second plated films 24a and 24b each have a Sn polycrystalline structure, and Sn—Ni alloy grains are formed at a Sn crystal grain boundary and within a Sn crystal grain, respectively. In this case, the Sn—Ni alloy grain preferably is flake-shaped.

The second plated films 24a and 24b each include 3 or more flake-shaped Sn—Ni alloy grains on average within one Sn crystal grain, in the Sn crystal grain contacting one of the first plated films 22a and 22b containing Ni. As a result, the effects and advantages of various preferred embodiments of the present invention are exhibited more remarkably.

One non-limiting example of a method of producing a laminated ceramic capacitor to produce the laminated ceramic capacitor 10 shown in FIG. 1 will now be described.

First, a ceramic green sheet, a conductive paste for an internal electrode and a conductive paste for an external electrode are prepared. The ceramic green sheet and the conductive pastes contain binders and solvents, and known organic binders and organic solvents may be used.

Next, the conductive paste for an internal electrode is printed onto the ceramic green sheet in a predetermined pattern by, for example, screen printing to form an internal electrode pattern.

A predetermined number of ceramic green sheets for an outer layer on which no internal electrode pattern is printed are stacked, ceramic green sheets on which an internal electrode pattern is printed are stacked thereon one after another, and a predetermined number of ceramic green sheets for an outer layer are stacked thereon to thereby prepare a mother laminate.

Subsequently, the mother laminate is pressed in the stacking direction preferably using a hydrostatic pressure press, for example.

The pressed mother laminate is cut into a predetermined size and a raw ceramic laminate is cut out. At this time, the raw ceramic laminate may be rounded at its corner and edge by barrel polishing, etc.

Subsequently, the raw ceramic is fired. In this case, the firing temperature depends on the materials of the ceramic layer 14 and internal electrodes 16a and 16b, but is preferably 900° C. to 1300° C., for example. The ceramic laminate after firing is a ceramic element 12 including the ceramic layer 14 of the laminated ceramic capacitor 10 and the internal electrodes 16a and 16b.

The conductive paste for an external electrode is coated on the opposite ends of the ceramic laminate after firing, and baked to thereby form external electrodes 20a and 20b of terminal electrodes 18a and 18b.

Subsequently, on the surfaces of the first external electrode 20a and the second external electrode 20b, first plated films 22a and 22b are formed, respectively, by plating, for example, Ni.

On the surfaces of the first plated films 22a and 22b, second plated films 24a and 24b are formed, respectively, by plating a metal containing Sn and carrying out a heat treatment. In this case, on the surfaces of the first plated films 22a and 22b, the second plated films 24a and 24b are formed by, for example, plating Sn and carrying out a heat treatment at a relatively low temperature for a long period of time.

The laminated ceramic capacitor 10 shown in FIG. 1 is produced in a manner described above.

In the laminated ceramic capacitor 10 shown in FIG. 1, the second plated films 24a and 24b defining outermost layers each have a Sn polycrystalline structure, and Sn—Ni alloy grains are formed not only at a Sn crystal grain boundary but also within a Sn crystal grain, thus dramatically improving a capability of suppressing and preventing whiskers. Thus, in the laminated ceramic capacitor 10, a short circuit failure caused by whiskers can be prevented.

The laminated ceramic capacitor 10 shown in FIG. 1 has good solderability because the second plated films 24a and 24b defining outermost layers each contain Sn.

Further, in the laminated ceramic capacitor 10 shown in FIG. 1, solder leach can be prevented because the first plated films 22a and 22b each contain Ni.

Further, the laminated ceramic capacitor 10 shown in FIG. 1 is also excellent in terms of environmental protection as Pb is not used in the first plated films 22a and 22b, the second plated films 24a and 24b, and so on.

Figure 2:
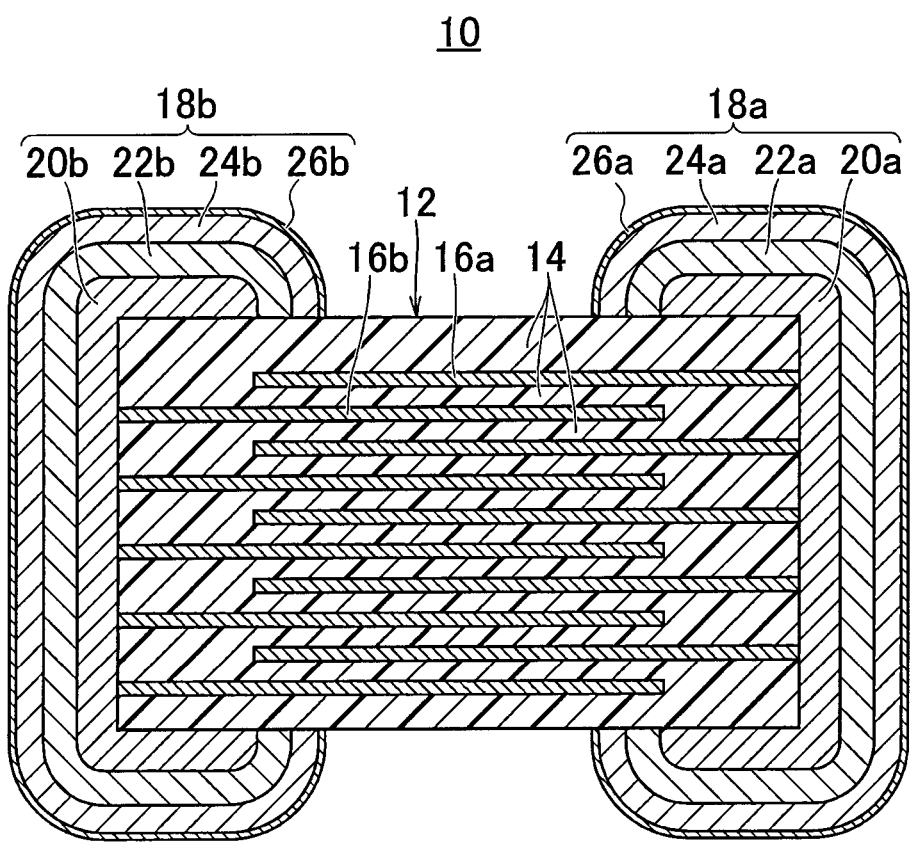
FIG. 2 is a cross-sectional schematic view showing another example of the laminated ceramic capacitor according to a preferred embodiment of the present invention.
Figure 3:
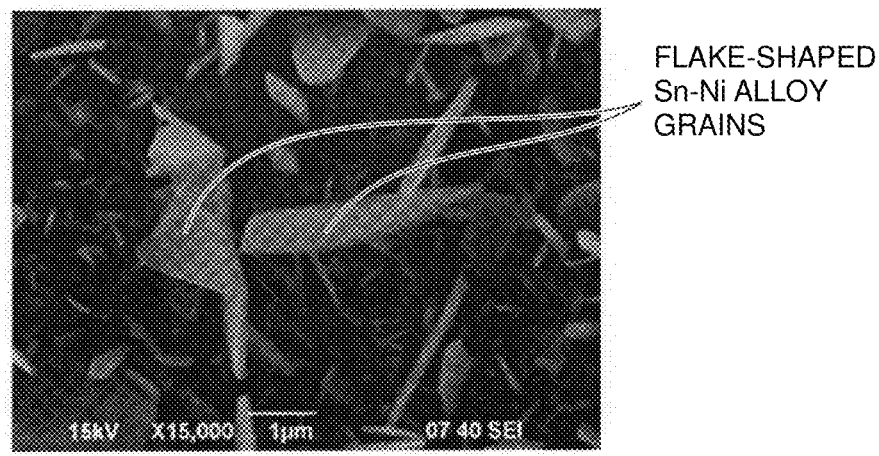
FIG. 3 is an electron photomicrographic image of the surface of a first plated film after dissolving and removing Sn in a second plated film that is the outermost layer in a laminated ceramic capacitor of Example 1.
Figure 4:
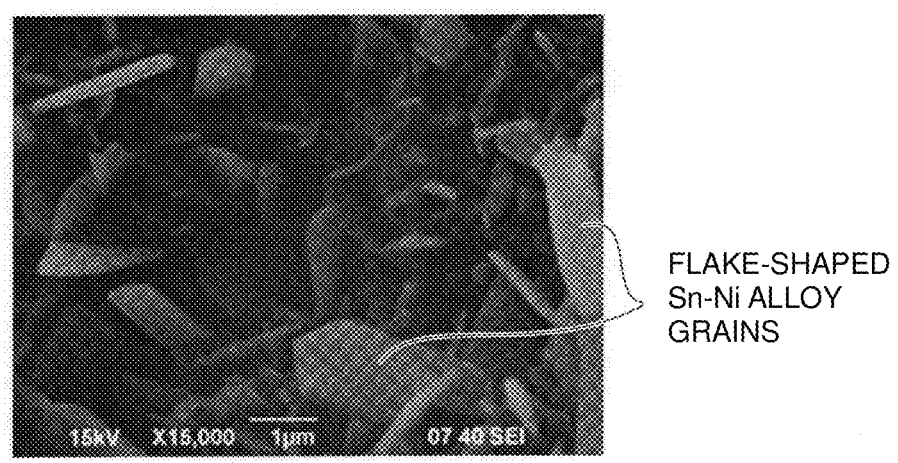
FIG. 4 is an electron photomicrographic image of the surface of a second plated film after dissolving and removing Sn in a third plated film that is the outermost layer in a laminated ceramic capacitor of Example 2.
Figure 5:
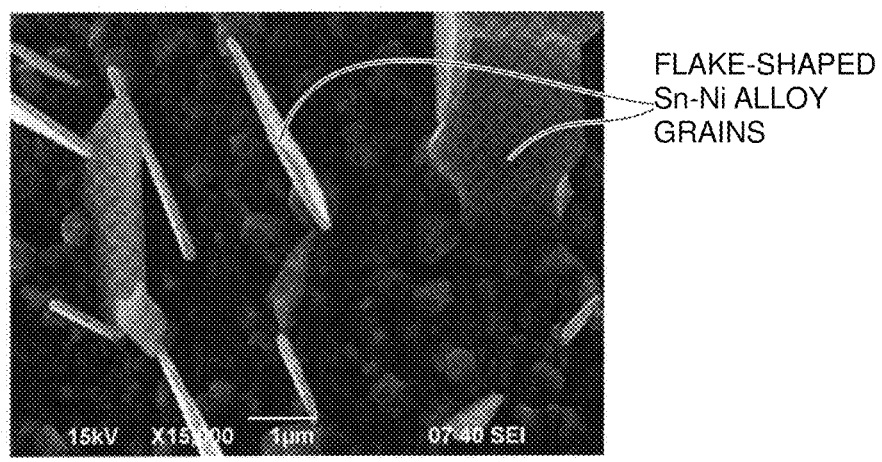
FIG. 5 is an electron photomicrographic image of the surface of a first plated film after dissolving and removing Sn in a second plated film that is the outermost layer in a laminated ceramic capacitor of Comparative Example 1.
Figure 6:
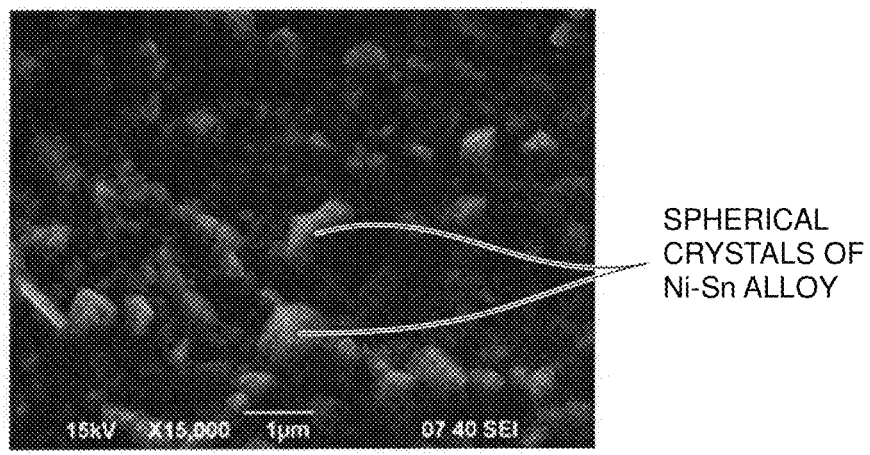
FIG. 6 is an electron photomicrographic image of the surface of a first plated film after dissolving and removing Sn in a second plated film that is the outermost layer in a laminated ceramic capacitor of Comparative Example 2.
Figure 7:
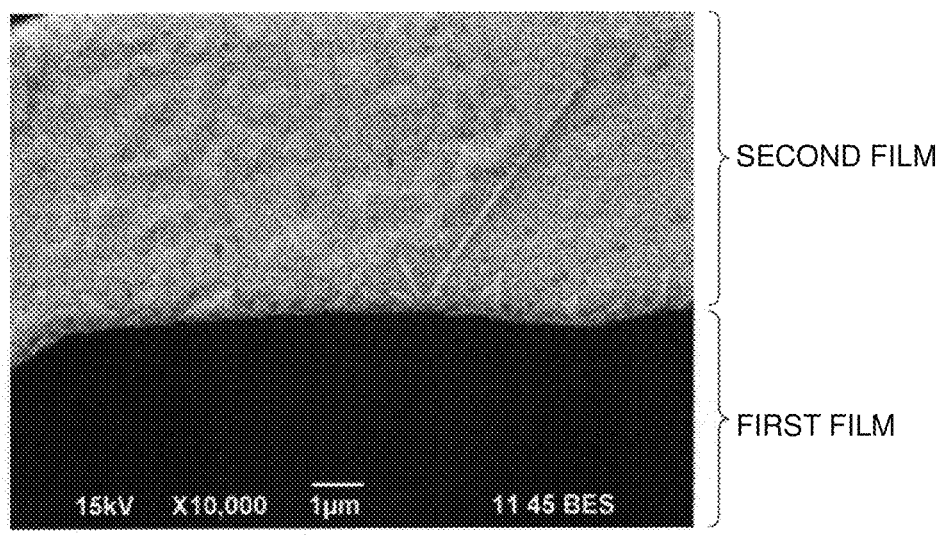
FIG. 7 is an electron photomicrographic image of a cross section cut along the direction of thickness of the first plated film and second plated film in the laminated ceramic capacitor of Example 1.
Figure 8:
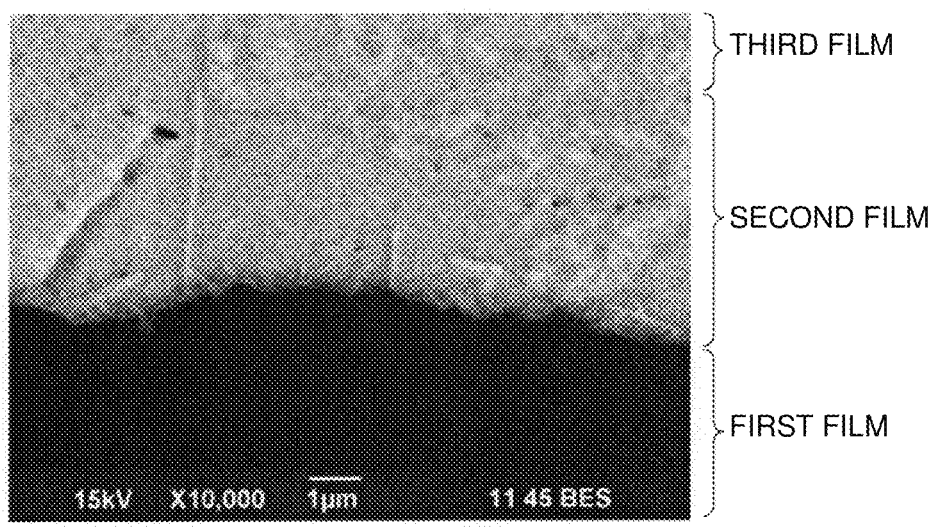
FIG. 8 is an electron photomicrographic image of a cross section cut along the direction of thickness of the first plated film, second plated film and third plated film in the laminated ceramic capacitor of Example 2.
Figure 9:
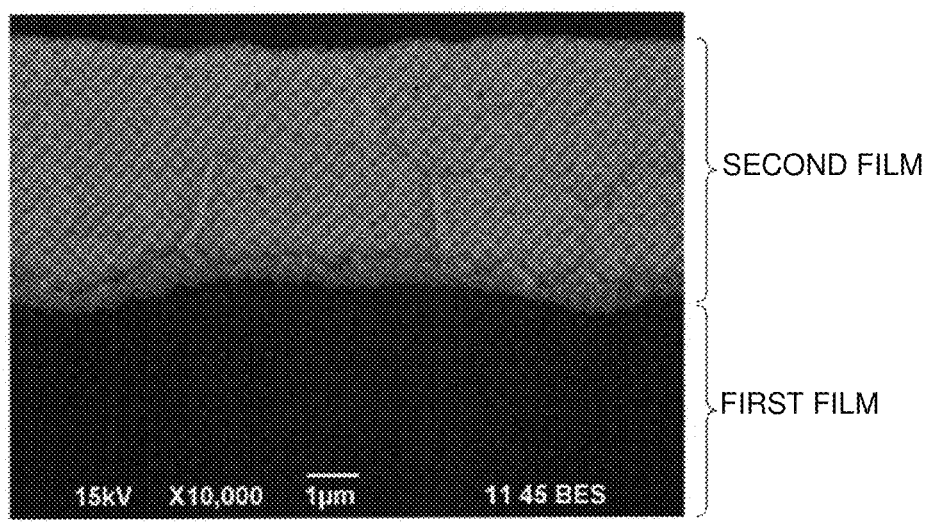
FIG. 9 is an electron photomicrographic image of a cross section cut along the direction of thickness of the first plated film and second plated film in the laminated ceramic capacitor of Comparative Example 1.
Figure 10:
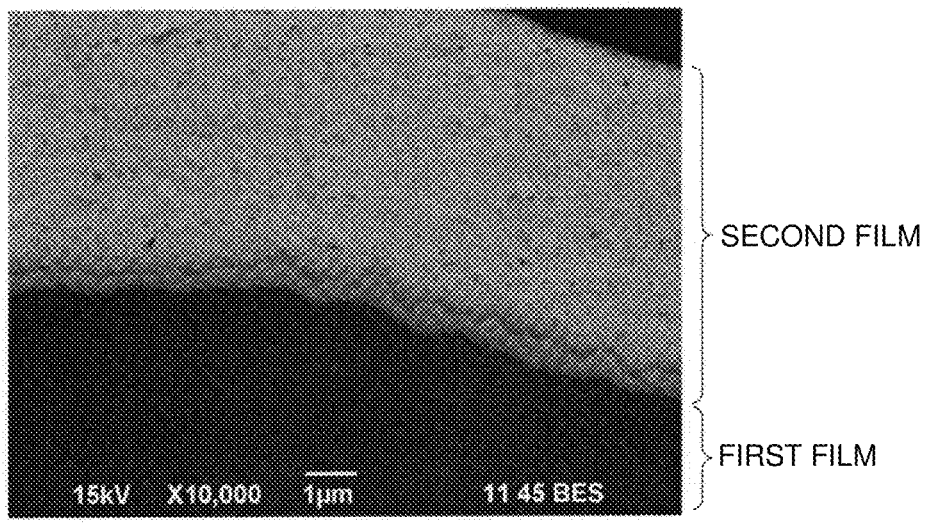
FIG. 10 is an electron photomicrographic image of a cross section cut along the direction of thickness of the first plated film and second plated film in the laminated ceramic capacitor of Comparative Example 2.

FIG. 2 is a cross-sectional schematic view showing another example of the laminated ceramic capacitor according to a preferred embodiment of the present invention. In a laminated ceramic capacitor 10 shown in FIG. 2, second plated films 24a and 24b containing Sn and Ni are provided on the surfaces of first plated films 22a and 22b containing Ni, respectively, as a Sn-plated film or Ni-plated film defining a middle layer, in comparison with the laminated ceramic capacitor 10 shown in FIG. 1. Further, on the surfaces of the second plated films 24a and 24b, third plated films 26a and 26b containing Sn to improve solderability are disposed, respectively, as Sn-plated films forming outermost layers.

In the laminated ceramic capacitor 10 shown in FIG. 2, the second plated films 24a and 24b and the third plated films 26a and 26b each have a Sn polycrystalline structure, and Sn—Ni alloy grains are formed at a Sn crystal grain boundary and within a Sn crystal grain, respectively. In this case, the Sn—Ni alloy grain preferably is flake-shaped.

The second plated films 24a and 24b each include 3 or more flake-shaped Sn—Ni alloy grains on average within one Sn crystal grain in the Sn crystal grain. The third plated films 26a and 26b each include 3 or more flake-shaped Sn—Ni alloy grains on average within one Sn crystal grain, in the Sn crystal grain contacting one of the second plated films 24a and 24b containing Ni.

For producing the laminated ceramic capacitor 10 shown in FIG. 2, a ceramic element 12, external electrodes 20a and 20b and the first plated films 22a and 22b are first formed by, for example, the same method as the abovementioned method for producing the laminated ceramic capacitor 10 shown in FIG. 1.

On the surfaces of the first plated films 22a and 22b, the second plated films 24a and 24b are formed, respectively, by plating an alloy containing Sn and Ni and carrying out a heat treatment, and on the surfaces of the second plated films 24a and 24b, the third plated films 26a and 26b are formed, respectively, by plating a metal containing Sn and carrying out a heat treatment. In this case, for example, a Sn—Ni alloy is plated onto the surfaces of the first plated films 22a and 22b, Sn is plated onto the surface of the Sn—Ni alloy plating, and a heat treatment is carried out at a relatively low temperature to thereby form the second plated films 24a and 24b and the third plated films 26a and 26b.

The laminated ceramic capacitor 10 shown in FIG. 2 is produced in a manner described above.

The laminated ceramic capacitor 10 shown in FIG. 2, like the laminated ceramic capacitor 10 shown in FIG. 1, exhibits the effects of dramatically improving a capability of suppressing and preventing whiskers, having good solderability, allowing prevention of solder leach and being excellent in terms of environmental protection.

Further, the laminated ceramic capacitor 10 shown in FIG. 2 also exhibits the effect of allowing the heat treatment time to be reduced because Ni is already present in the plating forming the second plated films 24a and 24b, other than the first plated films 22a and 22b, in comparison with the laminated ceramic capacitor 10 shown in FIG. 1.

EXPERIMENTAL EXAMPLE

In a non-limiting Experimental Example, laminated ceramic capacitors of Example 1, Example 2, Comparative Example 1 and Comparative Example 2 shown below were produced, and whiskers in plated films were evaluated for those laminated ceramic capacitors.

Example 1

In Example 1, the laminated ceramic capacitor 10 shown in FIG. 1 was produced by the abovementioned method for producing the laminated ceramic capacitor 10 shown in FIG. 1. In this case, the outside dimension of the laminated ceramic capacitor 10 was approximately 2.0 mm (length)×1.25 mm (width)×1.25 mm (height), for example. A barium titanate-based dielectric ceramic was used as a ceramic layer 14 (dielectric ceramic). Further, Ni was used as a material of internal electrodes 16a and 16b. Further, Cu was used as a material of external electrodes 20a and 20b.

In Example 1, first plated films 22a and 22b and second plated films 24a and 24b were formed under the following conditions.

(1) Plating Bath

Plating bath for forming the first plated film: a Ni bath generally called a Watts bath was used.

Bath for forming the second plated film: a weak acid Sn plating bath (citric acid-based weak acid bath) with tin sulfate as a metal salt, citric acid as a complexing agent and one or both of a quaternary ammonium salt and a surfactant containing an alkyl betaine as a gloss agent was used.

(2) Current Density and Current Passage Time

First plated film: the current passage time was controlled by current density $Dk=2.0$ $[A/dm^2]$ so that the film could be formed with a thickness of 5 μm to 10 μm.

Second plated film: the current passage time was controlled by current density $Dk=1.0$ $[A/dm^2]$ so that the film could be formed with a thickness of 5 μm to 10 μm.

(3) Plating Technique

Plating technique for forming first plated film and second plated film: a horizontal rotation barrel having a volume of 300 ml was used.

Further, in Example 1, a method for forming Sn—Ni alloy grains not only at a Sn crystal grain boundary but also within a Sn crystal grain in second plated films 24a and 24b is as follows.

Ni was plated onto the surfaces of external electrodes 20a and 20b as the first plated films 22a and 22b, Sn was plated onto the surface of the Ni plating as the second plated films 24a and 24b, and a heat treatment was carried out at 40° C. for 200 days.

Example 2

In Example 2, the laminated ceramic capacitor 10 shown in FIG. 2 was produced by the abovementioned method for producing the laminated ceramic capacitor 10 shown in FIG. 2. In this case, in Example 2, a ceramic element 12, external electrodes 20a and 20b and first plated films 22a and 22b were first formed by the same method as that in Example 1.

In Example 2, a Sn—Ni alloy was plated onto the surfaces of the first plated films 22a and 22b as the second plated films 24a and 24b, Sn was plated onto the surfaces of the Sn—Ni alloy plating as third plated films 26a and 26b, and a heat treatment was carried out to form the second plated films 24a and 24b and third plated films 26a and 26b.

Here, the composition of a Sn—Ni alloy plating bath for plating the Sn—Ni alloy is as follows.

$NiCl_2 \cdot 2H_2O$: 0.015 mol/L
$SnCl_2 \cdot 2H_2O$: 0.135 mol/L
$K_4P_2O_7$: 0.45 mol/L
glycine: 0.15 mol/L This Sn—Ni alloy plating bath is adjusted so that the concentration of Sn/Ni in a Sn—Ni alloy plating formed is 85 atm %/15 atm %.

A Sn—Ni alloy having a thickness of 4 μm to 8 μm according to "current density $Dk=0.5$ [$A/dm^2$]" was plated onto the surfaces of the first plated films 22a and 22b in the Sn—Ni alloy plating bath (Sn concentration: 90 atm %; Ni concentration: 10 atm %).

Sn was plated with a thickness 2 μm to 5 μm on the surface of the Sn—Ni alloy plating in the abovementioned Sn plating bath.

Comparative Example 1

In Comparative Example 1, a laminated ceramic capacitor similar to the laminated ceramic capacitor 10 shown in FIG. 1 was produced by the same method as that in Example 1. In this case, a heat treatment was carried out at 70° C. for 8 minutes.

Comparative Example 2

In Comparative Example 2, a laminated ceramic capacitor similar to the laminated ceramic capacitor 10 shown in FIG. 1 was produced by the same method as that in Example 1. In this case, a heat treatment was carried out at 150° C. for 3 hours.

Next, whiskers in the plated film were evaluated in accordance with the JEDEC standard shown below for the laminated ceramic capacitors of Examples 1 and 2 and Comparative Examples 1 and 2.

Number of samples (n): 3 lots×6/lot=18.

Test conditions: the sample is held at −55° C. (+0/−10) as a minimum temperature and 85° C. (+10/−0) as a maximum temperature for 10 minutes, respectively, and given 1500 cycles of thermal shock in a gas phase.

Observation: observations are made by a 1000× electron photomicrographic image using a scanning electron microscope (SEM).

Criterion: Class 2 (infrastructure equipment for communication, automobile equipment) was applied, and samples with the maximum length (straight line length) of whiskers being 45 μm or less were determined to be good and samples with the maximum length (straight line length) of whiskers being 46 μm or greater were determined to be poor.

FIGS. 3 to 6 show an electron photomicrographic image of the surface of a plated film after dissolving and removing Sn in a plated film that is the outermost layer in the laminated ceramic capacitor of each of Examples 1 and 2 and Comparative Examples 1 and 2, and FIGS. 7 to 10 show an electron photomicrographic image of the cross section cut along the direction of thickness of a plated film in the laminated ceramic capacitor of each of Examples 1 and 2 and Comparative Examples 1 and 2.

As a result, the sample was found to be good with the maximum length of whiskers being 30 μm in Example 1 and the sample was found to be even better good with the maximum length of whiskers being 20 μm in Example 2.

On the other hand, the sample was found to be poor with the maximum length of whiskers being 70 μm in Comparative Example 1 and the sample was found to poorer with the maximum length of whiskers being 100 μm in Comparative Example 2.

This is ascribable to the fact that in Examples 1 and 2, multiple flake-shaped Sn—Ni alloy grains were formed not only at a Sn crystal grain boundary but also within a Sn crystal grain in the Sn-plated film containing Sn, whereby growth of whiskers was considerably suppressed.

The effects of satisfactorily suppressing whiskers could be observed in either of the cases where Sn is plated onto the surface of a Ni plating and a heat treatment is carried out at a relatively low temperature of 40° C. for a long period of time of 200 days as in Example 1 and where a Sn—Ni alloy is plated, Sn is plated onto the surface of the Sn-Nu alloy plating and a heat treatment is carried out at a relatively low temperature of 40° C. for a short period of time of 96 hours as in Example 2.

On the other hand, in Comparative Example 1, since a heat treatment was carried out at 70° C., a temperature higher than the temperature (40° C.) in Examples 1 and 2 but only for a very short period of time of 8 minutes, flake-shaped Sn—Ni alloy grains were only at a Sn crystal grain boundary in the Sn-plated film containing Si, i.e., the outermost layer, and the whisker suppressing effect was poor.

In Comparative Example 2, since a heat treatment was carried out at a very high temperature of 150° C., only spherical crystals of the Sn—Ni alloy were formed only at a Sn crystal grain boundary in the Sn-plated film containing Sn, i.e., the outermost layer, and the whisker suppressing effect was further poor.

In Example 1, the thickness of 5 μm with which whiskers most easily grow was selected as a thickness of each of the second plated films 24a and 24b, but it has also been found that whiskers could be satisfactorily suppressed and prevented with the thickness of each of the second plated films 24a and 24b being in the range of about 1 μm to about 10 μm, for example.

Thus, in Examples 1 and 2, whiskers can be satisfactorily suppressed and prevented even if each plated film is formed with a different thickness.

For example, in Example 2, whiskers can be satisfactorily suppressed even if each of the second plated films 24a and 24b is in the range of about 0.5 μm to about 9.5 μm, for example, and whiskers can be satisfactorily suppressed and prevented even if each of the third plated films 26a and 26b is in the range of about 0.5 μm to about 9.5 μm, for example.

In each of Examples 1 and 2 described above, a heat treatment was carried out under specific conditions, but even if a heat treatment is carried out under different conditions, whiskers can be satisfactorily suppressed and prevented.

For example, in Example 1, whiskers can be satisfactorily suppressed and prevented even if a heat treatment is carried out at a relatively low temperature of about 25° C. to about 35° C. and for a long period of time of 240 to 300 days, for example.

In Example 2, whiskers can be satisfactorily suppressed and prevented even if a heat treatment is carried out at a relatively low temperature of about 25° C. to about 35° C. and for a short period of time of 110 to 150 hours, for example.

In Example 1, the second plated films are formed by plating Sn onto the surface of the Ni plating and carrying out at a relatively low temperature for a long period of time, but the second plated films as Sn-plated films forming outermost layers may be formed by plating a Sn-rich Sn—Ni alloy instead of plating of Sn and carrying out a heat treatment at a relatively low temperature for a short period of time. If the second plated films are formed in this way, solderability is slightly reduced but is still good and whiskers can be satisfactorily suppressed and prevented because a Sn-rich Sn—Ni alloy is plated and a heat treatment is carried out.

In the preferred embodiments and Examples 1 and 2 described above, a barium titanate-based dielectric ceramic is preferably used as a dielectric material but instead, for example, a calcium titanate-based, strontium titanate-based or calcium zirconate-based dielectric ceramic may be used. As a ceramic material of the ceramic layer 14, one incorporating an accessory ingredient such as a Mn compound, a Mg compound, a Si compound, a Co compound, a Ni compound or a rare earth compound may be used.

In the preferred embodiments and Examples 1 and 2 described above, Ni is preferably used as an internal electrode but instead, for example, Cu, Ag, Pd, an Ag—Pd alloy, Au or the like may be used.

Further, in the preferred embodiments and Examples 1 and 2 described above, Cu is preferably used as an external electrode but instead, for example, one selected from the group consisting of Ag and Ag/Pd or an alloy containing such metals may be used.

The electronic component according to various preferred embodiments of the present invention is suitably used particularly for electronic components such as laminated ceramic capacitors which are densely mounted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component including a Sn-plated film, wherein the Sn-plated film has a polycrystalline structure, and Sn—Ni alloy grains are located at a Sn crystal grain boundary and within a Sn crystal grain.

2. The electronic component according to claim 1, wherein the Sn—Ni alloy grain is flake-shaped.

3. The electronic component according to claim 1, wherein an Ni-plated film is arranged to contact an inside of the Sn-plated film.

4. The electronic component according to claim 3, wherein at least three Sn—Ni alloy grains on average are located within a Sn crystal grain contacting the Ni-plated film in the Sn-plated film.

* * * * *